US012478197B2

(12) United States Patent
Uland et al.

(10) Patent No.: US 12,478,197 B2
(45) Date of Patent: Nov. 25, 2025

(54) METALIZED FABRIC HEATING BLANKET ELECTRICAL CONNECTOR

(71) Applicant: Encompass Group, LLC, McDonough, GA (US)

(72) Inventors: David Uland, Granville, OH (US); Jon Hermanson, Knoxville, TN (US); Steven P Baker, Farragut, TN (US)

(73) Assignee: Encompass Group, LLC, McDonough, GA (US)

( * ) Notice: Subject to any disclaimer, the term of this patent is extended or adjusted under 35 U.S.C. 154(b) by 1102 days.

(21) Appl. No.: 17/479,077

(22) Filed: Sep. 20, 2021

(65) Prior Publication Data

US 2022/0047102 A1 Feb. 17, 2022

Related U.S. Application Data

(63) Continuation-in-part of application No. 17/031,055, filed on Sep. 24, 2020, now abandoned, which is a (Continued)

(51) Int. Cl.
*A47G 9/02* (2006.01)
*H05B 3/34* (2006.01)

(52) U.S. Cl.
CPC ........... *A47G 9/0215* (2013.01); *H05B 3/342* (2013.01); *H05B 2203/015* (2013.01)

(58) Field of Classification Search
CPC ...... H05B 2203/016; H05B 3/06; H05B 3/08; H05B 2203/011; H05B 2203/007; H05B 2203/035; H05B 3/0019; H05B 3/342; H05B 2203/015; H01R 12/515; H01R 13/639; H01R 13/20; H01R 13/213; H01R 13/22; H01R 4/646; H01R 24/28; H01R 24/66; H01R 12/778; H01R 24/20; H01R 11/28; H01R 13/506; H01R 13/64; H01R 24/76; H01R 31/00; H01R 4/54; H01R 13/424; H01R 25/162; H01R 12/7017;
(Continued)

(56) References Cited

U.S. PATENT DOCUMENTS 4,719,335 A 1/1988 Batliwalla et al.
6,229,123 B1 5/2001 Kochman et al.
(Continued)

*Primary Examiner* — Helena Kosanovic
(74) *Attorney, Agent, or Firm* — Baker, Donelson, Bearman, Caldwell & Berkowitz, PC

(57) ABSTRACT

A warming blanket includes a metalized fabric exterior layer and an interior heating element made of a carbon fiber or carbon veil. The warming blanket has two oppositely disposed electrodes. The carbon veil includes a central portion positioned between two oppositely disposed margin areas. A temperature sensor is positioned upon the central portion of the heating element.

The warming blanket also has an electrical connector having a hub connector including a pair of spaced apart side guide rails and a guide flange. The electrical connector also has a hub assembly removably coupled to the hub connector. The hub assembly has a mounting tongue being sized and shaped to fit between the spaced part side guide rails and between the second portion of the guide flange and the mounting plate. The hub connector and hum assembly have mating electrical snaps.

12 Claims, 14 Drawing Sheets

Related U.S. Application Data continuation-in-part of application No. 16/712,181, filed on Dec. 12, 2019, now abandoned, which is a continuation-in-part of application No. 15/920,383, filed on Mar. 13, 2018, now abandoned, which is a continuation-in-part of application No. 15/841,044, filed on Dec. 13, 2017, now Pat. No. 10,805,988.

(60) Provisional application No. 62/471,103, filed on Mar. 14, 2017.

(58) Field of Classification Search
CPC .. H01R 13/432; H01R 13/627; H01R 13/741; H01R 33/7642; A47G 9/0215; C23C 14/58; C23C 14/5813
See application file for complete search history.

(56) References Cited

U.S. PATENT DOCUMENTS

| | | | | |
|---|---|---|---|---|
| 6,653,607 | B2 | 11/2003 | Ellis et al. | |
| 6,770,848 | B2 | 8/2004 | Haas et al. | |
| 6,924,467 | B2 | 8/2005 | Ellis et al. | |
| 6,933,469 | B2 | 8/2005 | Ellis et al. | |
| 6,967,309 | B2 | 11/2005 | Wyatt et al. | |
| 7,022,950 | B2 | 4/2006 | Haas et al. | |
| 7,176,419 | B2 | 2/2007 | Ellis et al. | |
| 7,196,289 | B2 | 3/2007 | Ellis et al. | |
| 7,375,308 | B2 | 5/2008 | Ferguson | |
| 7,786,408 | B2 | 8/2010 | Augustine et al. | |
| 7,851,729 | B2 | 12/2010 | Augustine et al. | |
| 8,062,343 | B2 | 11/2011 | Augustine et al. | |
| 8,283,602 | B2 | 10/2012 | Augustine et al. | |
| 8,624,164 | B2 | 1/2014 | Deibel et al. | |
| 8,664,572 | B2 | 3/2014 | Bridges | |
| 8,772,676 | B2 | 7/2014 | Augustine et al. | |
| 8,876,812 | B2 | 11/2014 | Aramayo | |
| 9,161,393 | B2 | 10/2015 | Kaiserman et al. | |
| 9,687,093 | B2 | 6/2017 | Giles et al. | |
| 10,206,248 | B2 | 2/2019 | Augustine et al. | |
| 2002/0153368 | A1 | 10/2002 | Gardner et al. | |
| 2005/0007406 | A1 | 1/2005 | Haas et al. | |
| 2007/0068923 | A1 | 3/2007 | Augustine et al. | |
| 2008/0093356 | A1 | 4/2008 | Pizzi | |
| 2010/0161016 | A1 | 6/2010 | Augustine et al. | |
| 2010/0200558 | A1 | 8/2010 | Liu et al. | |
| 2010/0255277 | A1 | 10/2010 | Platt et al. | |
| 2011/0233193 | A1 | 9/2011 | Cheng | |
| 2013/0020304 | A1 | 1/2013 | Zainzinger et al. | |
| 2014/0263265 | A1 | 9/2014 | Ugustine et al. | |
| 2014/0316494 | A1 | 10/2014 | Augustine et al. | |
| 2015/0072113 | A1 | 3/2015 | Terrell | |
| 2015/0148874 | A1 | 5/2015 | Augustine et al. | |
| 2015/0327332 | A1 | 11/2015 | Augustine et al. | |
| 2015/0366367 | A1 * | 12/2015 | Augustine .............. | H05B 3/146 219/217 |
| 2016/0294040 | A1 | 10/2016 | Blair | |
| 2017/0135855 | A1 | 5/2017 | Stefan et al. | |
| 2018/0124871 | A1 | 5/2018 | Barfuss et al. | |
| 2018/0279416 | A1 | 9/2018 | Sajic et al. | |
| 2019/0148901 | A1 * | 5/2019 | Komoto ................. | H01R 33/74 439/271 |
| 2019/0240066 | A1 | 8/2019 | Hood et al. | |
| 2019/0351153 | A1 | 11/2019 | Howard et al. | |

* cited by examiner

METALIZED FABRIC HEATING BLANKET ELECTRICAL CONNECTOR

REFERENCE TO RELATED APPLICATION

This is a continuation-in-part of U.S. patent application Ser. No. 17/031,055 filed Sep. 24, 2020 and entitled "Metalized Fabric Heating Blanket", which is a continuation-in-part of U.S. patent application Ser. No. 16/712,181 filed Dec. 12, 2019 and entitled "Metalized Fabric Heating Blanket", which is a continuation-in-part of U.S. patent application Ser. No. 15/920,383 filed Mar. 13, 2018 and entitled "Metalized Fabric Heating Blanket And Method Of Manufacturing Such", which is a continuation-in-part of U.S. patent application Ser. No. 15/841,044 filed Dec. 13, 2017 and entitled "Metalized Fabric Heating Blanket". U.S. patent application Ser. Nos. 15/920,383 and 15/841,044 claim the benefit of U.S. Provisional Patent Application Ser. No. 62/471,103 filed Mar. 14, 2017 and entitled "Metalized Fabric Heating Blanket And Method of Manufacturing Such".

TECHNICAL FIELD

This invention relates generally to heating blankets, and more particularly to the electrical connector for a heating blankets utilizing metalized fabrics and the method of manufacturing such.

BACKGROUND OF THE INVENTION

Thermally insulative blankets and the like have been made for centuries. Such blankets have traditionally been made of a wool or cotton cloth. These materials have provided a certain amount of heat retaining qualities, however, they are not optimal for such a task.

It has recently been discovered that blankets and clothing may be made of a metalized material to provide the added benefit of infrared heat reflecting capabilities to better prevent heat loss from a person. These products may be used as outdoor blankets, medical patient coverings, or other clothing wherein the conservation of body heat is desired. These metalized fabrics however are usually stiff and not soft to the touch.

Encompass Group, LLC has provided a metalized fabric material under the tradename Thermoflect for many years. This metalized fabric has four discrete layers which are bonded together to form the fabric. These four layers include a clear polyethylene layer, a vaporized aluminum layer, a second polyethylene layer, and a smooth surface spunbond polypropylene layer, these layers being recited in sequence from an exterior surface to an interior surface facing a person donning an article incorporating the fabric. It would be desirous to have a metalized fabric material which is softer to the touch and less stiff to provide better draping and loft characteristics. It would also be desirous to provide supplemental heating to warm the person in a quicker and more efficient manner.

One way of providing supplemental heating is to couple electrically resistive heating elements to a blanket. As electricity is passed through the heating elements, heat is produced which is utilized to warm a person. A problem with these electric warming blankets is that they are not efficient. Another problem is that they produce uneven warming areas, as heat is concentrated in the area of the heating element.

Another problem with warming blankets is that they may include a temperature sensor positioned along a side edge of the warming blanket. As the heating element may have different temperatures across its surface area, a monitoring of an accurate temperature may be difficult.

Another problem is that with most warming blankets the electrical components are permanently connected to the blanket portion. As such, when the blanket portion gets soiled, the entire warming blanket must be discarded.

It would be beneficial to provide a warming blanket which provides a more efficient, fast, cost effective, and consistent heat to a person so that it may be more suitable for use upon a person than those of the prior art. Accordingly, it is to the provision of such that the present invention is primarily directed.

SUMMARY OF THE INVENTION

In a preferred form of the invention an electrical connector comprises a hub connector having a mounting plate, a pair of spaced apart side guide rails extending from the mounting plate, a guide flange with a first portion extending from the mounting plate and a second portion extending laterally from the first portion. The guide flange is positioned between the side guide rails, and a pair of electrically conductive first snap portions coupled to the mounting plate. The electrical connector also has a hub assembly removably coupled to the hub connector. The hub assembly has a hub housing, a mounting tongue extending from the hub housing and being sized and shaped to fit between the spaced part side guide rails and between the second portion of the guide flange and the mounting plate, and a pair of electrically conductive second snap portions configured to mate with the pair of electrically conductive first snap portions. The pair of electrically conductive second snap portion are coupled to the hub housing to be in alignment with the pair of electrically conductive first snap portions when the mounting tongue abuts the first portion of the guide flange.

DETAILED DESCRIPTION

Figure 1:
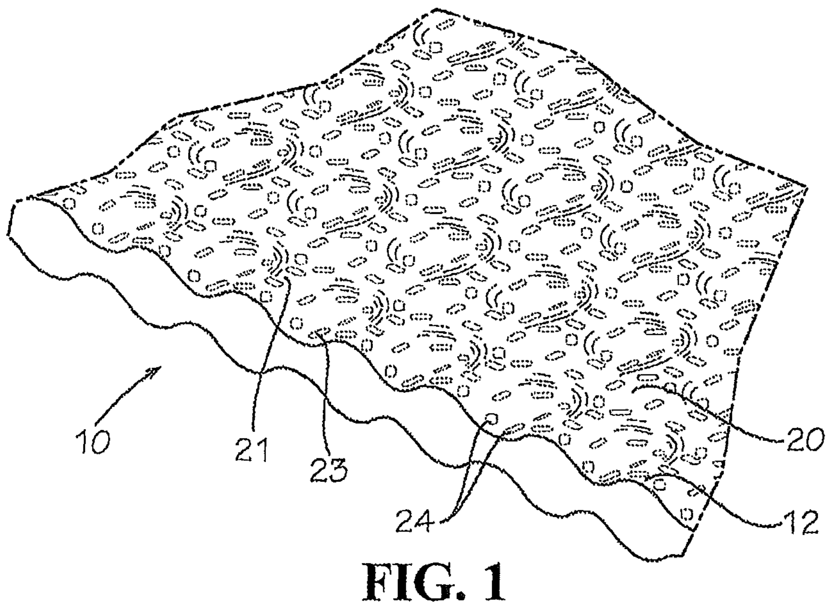
FIG. 1 is a perspective view of a warming blanket embodying principles of the invention in a preferred form.
Figure 2:
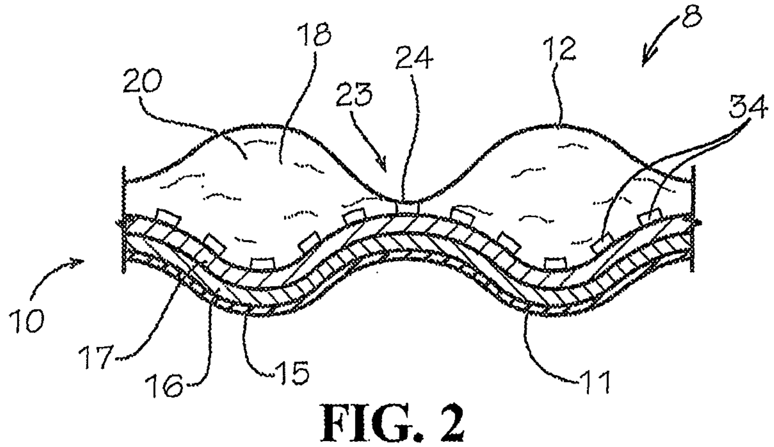
FIG. 2 is a cross-sectional view of a portion of the warming blanket of FIG. 1.
Figure 3:
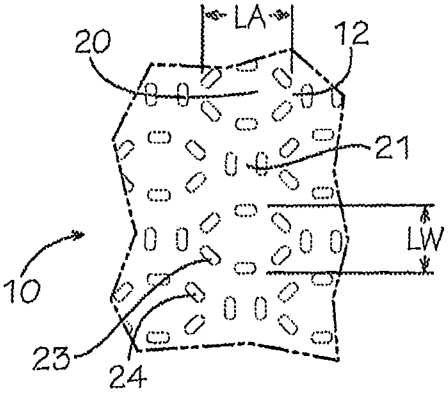
FIG. 3 is a top view of a portion of the warming blanket of FIG. 1.

With reference next to the drawings, there is shown a warming blanket 8 made in part with a metalized fabric 10 embodying principles of the invention in a preferred form. The warming blanket 8 has a lower surface 11 which is intended to face away from a person (patient) overlaid with or donning the material and an upper surface 12 which is intended to face the person (patient).

The metalized fabric includes a first layer 15 of clear thermoplastic (for example a polyethylene) material, a second layer 16 of vaporized aluminum material (solid metalized layer), a third layer 17 of thermoplastic (for example a polyethylene) material, and a fourth layer 18 of lofted billow spunbond thermoplastic (for example a polypropylene)non-woven material. The exterior surface of the first layer 15 constitutes the fabric lower surface 11, while the exterior surface of the fourth layer 18 constitutes the upper surface 12.

The warming blanket 8 also includes a resistive heating portion 30 positioned between the third layer 17 and the fourth layer 18. The resistive heating portion 30 is positioned distally from the perimeter or outer edge of the warming blanket 31 and metalized fabric 10 so that a surrounding margin 32 is formed there between.

Figure 4:
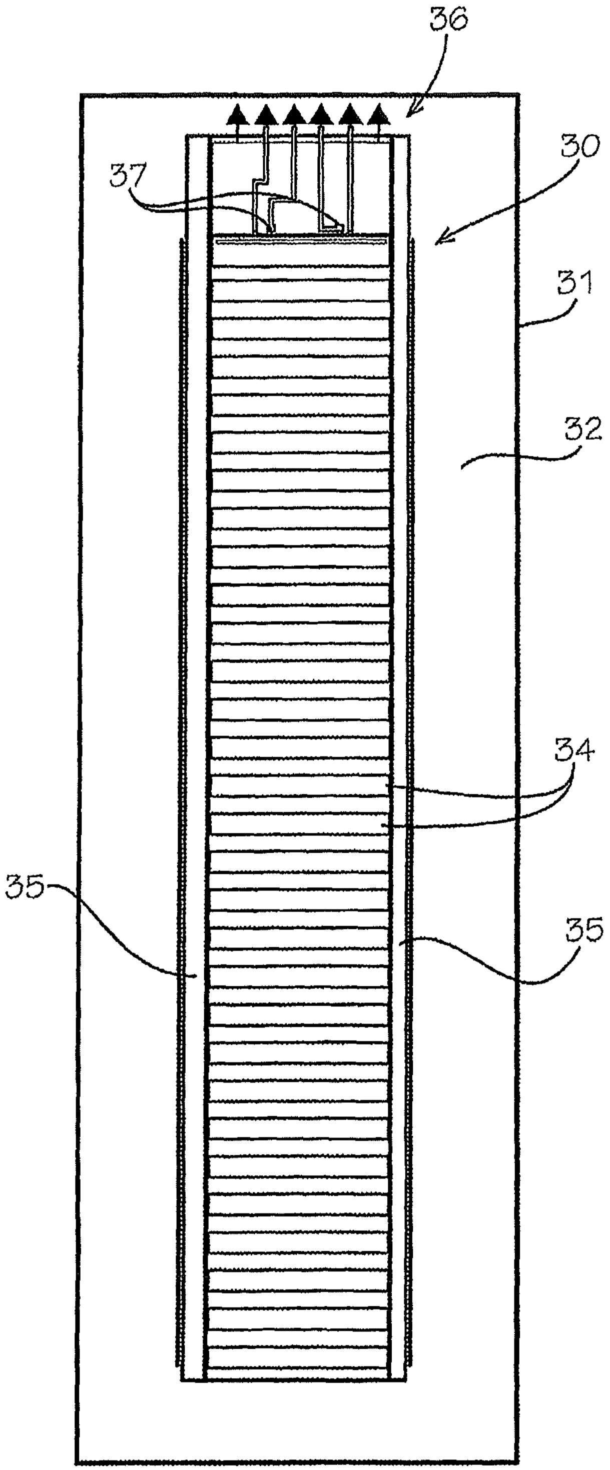
FIG. 4 is a plan view of the warming blanket of FIG. 1.

The resistive heating portion 30 has heater trace resistors or heating elements 34 arranged in a longitudinal array with each heating element 34 extending laterally, as best shown in FIG. 4. The heating elements 34 are formed by depositing a conventional electrically conductive ink upon the third layer 17 in the desired pattern. The heating elements 34 are electrically joined together through a pair of conductive tapes 35 coupled to the ends of the heating elements. The conductive tapes 35 may be made of a metal, such as copper, or in the alternative, the conductive tapes 35 may be replaced by additional conductive ink strips or any other configuration of a conductive element. The resistive heating portion 30 may also include a convention flat flex crimp pin type connectivity or coupler 36 to allow a quick connect to a controller 43, which may also include thermistors 37, or thermocouples, to regulate the current and temperature of the warming blanket 8.

The warming blanket 8 may have an input voltage of 100 to 250 VAC and a maximum blanket power of 7 W @12 VDC to 109 W @ 48 VDC.

The metalized fabric is manufactured by joining the third layer 17 of thermoplastic material having the resistive heating portion 30 thereon to the fourth layer 18 of non-woven or spunbond thermoplastic non-woven material. The second layer 16 of vaporized aluminum material is then deposited or joined onto the third layer 17 via a vacuum deposit chamber. The first layer 15 is then extruded or joined onto the second layer 16. The combination of layers is then passed through cold calendar rollers which seals the layers together in a pattern that forms a series, matrix or field of large pillowed areas or regions 20 surrounded at four sides by smaller pillowed regions 21. The large pillowed region 20 is generally oval in shape with a longitudinal length LA of approximately 3/16 of an inch and a lateral width LW of approximately 2/16 of an inch. The seals 23 themselves are non-continuous or fragmented, as they are formed by several unjoined segments 24 which also helps in providing a less stiff feel to the metalized fabric by breaking up the seals which tend to be stiffer than those areas of the fabric which are not sealed, i.e., the bonding of the material at the seals tends to stiffen the sealed areas and thereby tends to stiffen the overall material decreasing its drapability and loft. The metalized fabric of the present invention is fused, bonded or sealed on approximately 14% of the material, as opposed to the prior art material which included at a minimum 18% fusing, bonding or sealing.

It is believed that the position of the heating elements between the person and the metalized second layer 16 provides for an more even distribution of heat. Heat produced from the heating elements is reflected by the metalized second layer 16 back onto the person. Thus, heat initially drawn away from the person is not lost to ambient environment and is instead used to heat the person, a distinct advantage over the prior art.

It is believed that the pillowing of the metalized fabric provides for greater insulative qualities, a softer feel, better glare reduction, improved drapability, and improved loft. Another discovered advantage has been the materials improved cross-direction tearing resistance. A test was conducted comparing the prior Thermoflect metalized material, previously described, to the metalized fabric of the present invention. The metalized fabric of the present invention was found to have a cross directional tearing factor of 435.7, while the prior Thermoflect metalized material had a tested cross directional 15 tearing factor of 393. This test shows an improvement in tearing resistance of approximately eleven percent (11%).

Figure 5:
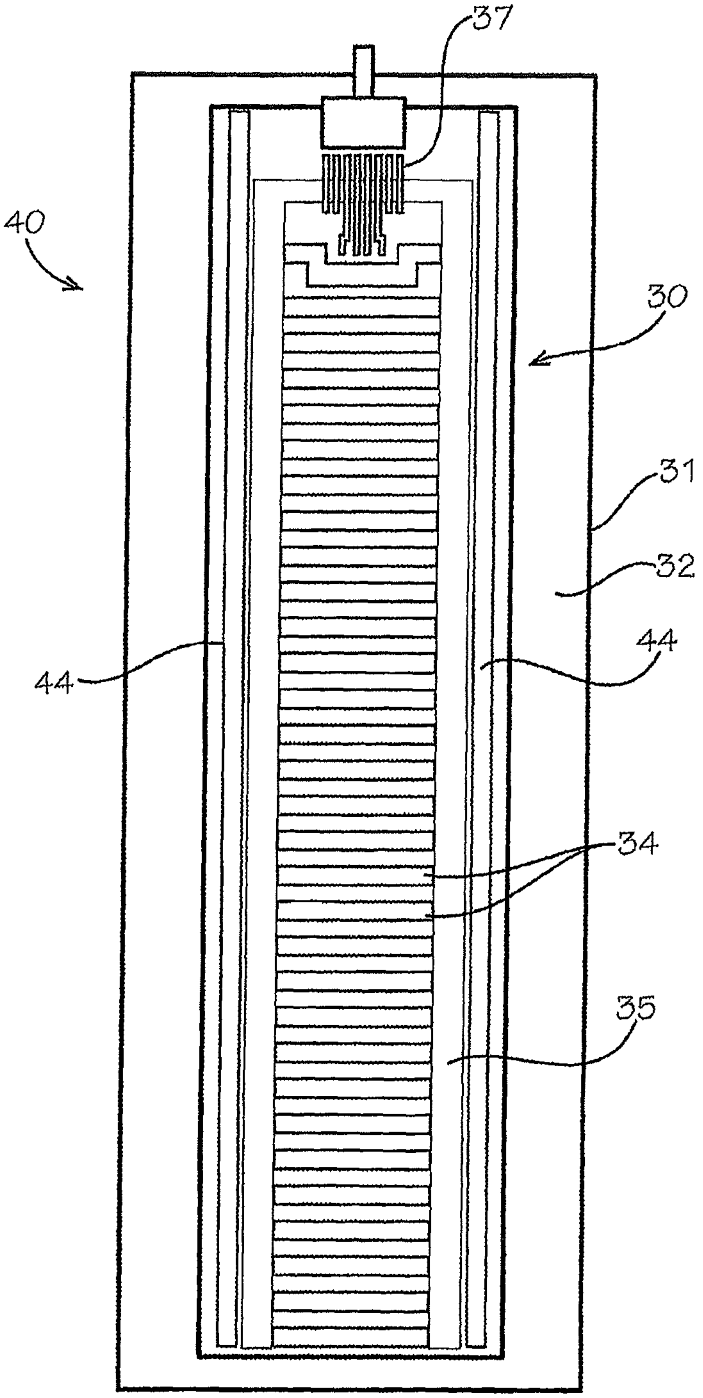
FIG. 5 is a plan view of a warming blanket embodying principles of the invention in another preferred form.
Figure 6:
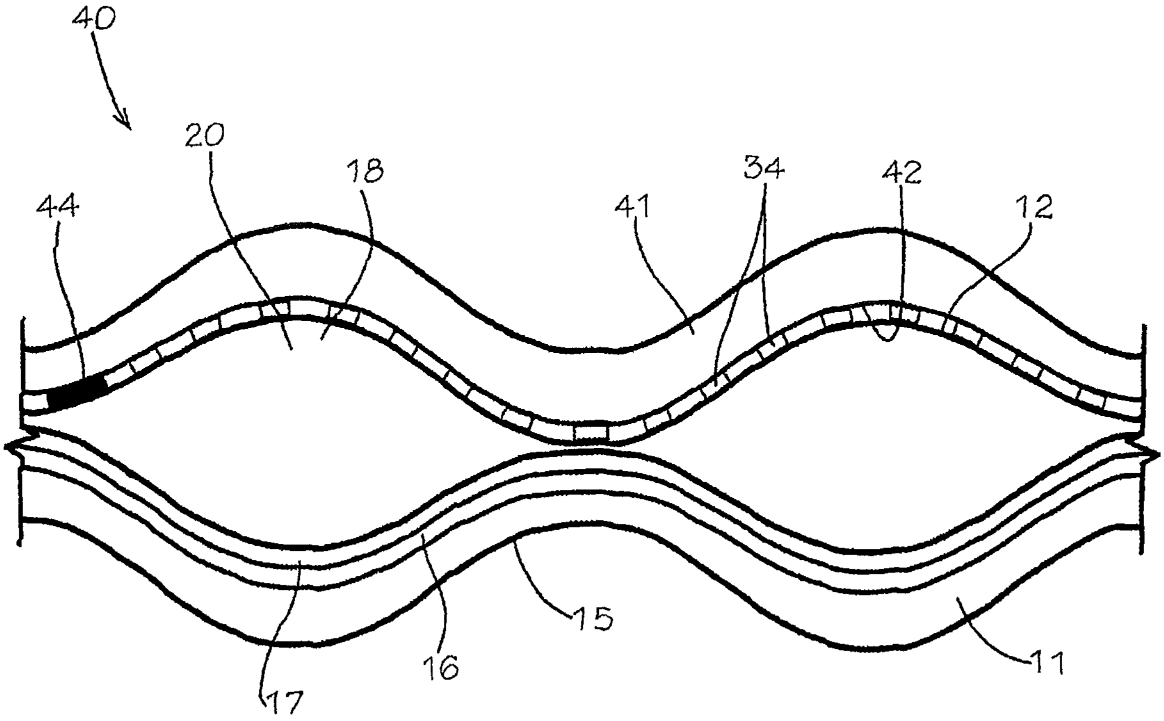
FIG. 6 is a cross-sectional view of a portion of the warming blanket of FIG. 5.
Figure 7:
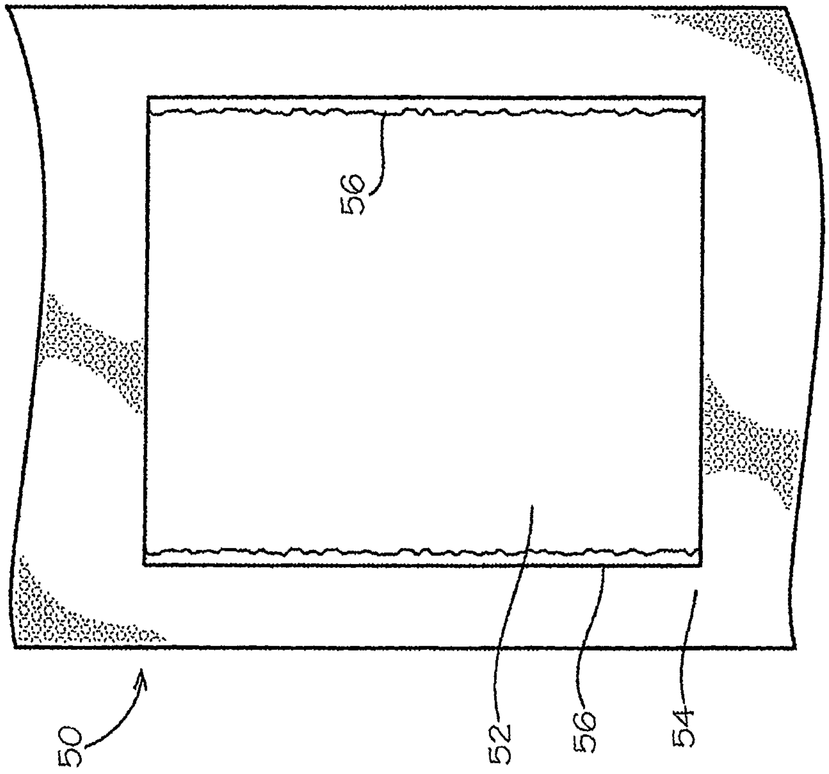
FIGS. 7-12 are a series of top view of a warming blanket in another preferred embodiment, showing the manufacturing process.

As an alternative to the first embodiment, a second embodiment of the invention in a preferred form is shown in FIGS. 5 and 6. Here, warming blanket 40 has the previously described first layer 15, second layer 16, third layer 17 and fourth layer 18 are formed as a unitary structure. A fifth layer 41 is coupled to the fourth layer 18. The fifth layer 41 may be a non-woven or spunbond thermoplastic (for example a polypropylene)non-woven material. The fifth layer 41 includes the resistive heating portion 30, and especially all the previously described components including the heating elements 34 which may be in the form of electrically conductive ink, bonded or coupled to the interior surface 42 of the fifth layer 41 facing the fourth layer 18.

A pair of double-sided tape strips 44 may be applied to the fifth layer 41 so that it may be attached or coupled to a pre-existing warming blanket. Also, if need be, the fifth layer 41 with the electronic components may be easily removed or released from the warming blanket. As such, an existing warming blanket may be converted from a static "6" or strictly body heat capturing warming blanket to a positive or active electrically resistive heat added warming blanket. The warming blanket may then be reconfigured to a static body heat capturing warming blanket by removing the fifth layer 42 and electronic components. In this manner, the electronic components may be attached and then removed from multiple warming blankets should they become soiled or otherwise unusable and may be disposed. This disposability of the blanket component while reusability of the major electrical components decreases the expense involved in providing warming blankets having resistive heating capabilities.

It is believed that this embodiment provides an even higher amount of heat disbursement or distribution as a portion of the heat from the heating elements 34 initially radiating in the direction away from the patient is dispersed as it passes through the fourth layer 18, is reflected by the second layer 16, and then disperses even more as it passes again through the fourth layer 18 prior to reaching the person, i.e., the heat passes through the fourth layer 18 twice before reaching the person. This also allows the temperature of the conductive heating clement 34 to be set at a lower temperature because of the additional reflected heat being directed back to the person.

It should be understood that as used herein the term "lofted" is intended to mean something that is fluffed, fluffy, expanded, expanded layers, or the like. Also, the term "billow" or "billowed" is intended to mean raised, embossed, undulating surface, having lofted areas, or the like. The use of a lofted inner material is believed to allow the heat from the heating elements 34 and that reflected back from the metalized second layer 16 to spread or diffuse the heat so as to provide a more even heating, as opposed to a concentration of the heat should a thin layer be utilized.

With reference next to the embodiment of FIGS. 7-13, there is shown a heating blanket 40 in another preferred form of the invention.

Here, the heating elements 34 are formed by adhering a small patch 53 of electrically insulative spunbond material to an exterior facing surface of an electrically conductive veil material 52, wherein the electrically conductive veil material 52 may be a sheet, web, or veil, nonwoven material at least a portion of which is randomly orientated electrically conductive fibers or sections of fibers, such as a carbon veil material carbon fibers or the like. The term carbon will be used hereinafter for ease of explanation in reference to the electrically conductive material, but it should not be construed to mean that this is a limitation of the present invention as many other electrically conductive materials or fibers may be used. The carbon veil may be 20 to 25 percent carbon with the remaining portion a cellulose acetate for a carbon veil width of twelve inches. This provides an electric resistance of 3 to 7 ohms. If the carbon veil is wider, the amount of carbon material therein should be increased to provide an even electric current distribution.

The carbon veil material 52 is then adhered, through sewing, adhesive, sonic welding or the like, to a second layer of electrically insulative spunbond material 63 which will be later bonded to a previously discussed metalized fabric 54. The metalized fabric 54 is generally the same as that previously described and which includes the first layer 15 of clear thermoplastic (for example a polyethylene) material, the second layer 16 of vaporized aluminum material (metalized layer), a third layer 17 of thermoplastic (for example a polyethylene) material, and a fourth layer 18 of lofted billow spunbond thermoplastic (for example a polypropylene) non-woven material. The third layer 17 and fourth layer 18 may also be electrically insulative.

Next, an electrode in the form of a conductive strip in the form of an electrically conductive ink layer 56, which may be made of metal or metal coated particles such as copper, nickel or silver ink, is deposited, sprayed upon, or printed onto opposite side edges of the carbon veil material 52. As such, the conductive ink layer 56 may also be termed as thin strips or side rails 56, also shown in FIG. 7. The conductive ink side rails 56 act to locally connect the random conductive fibers at different depth of the carbon veil material 52.

Figure 8:
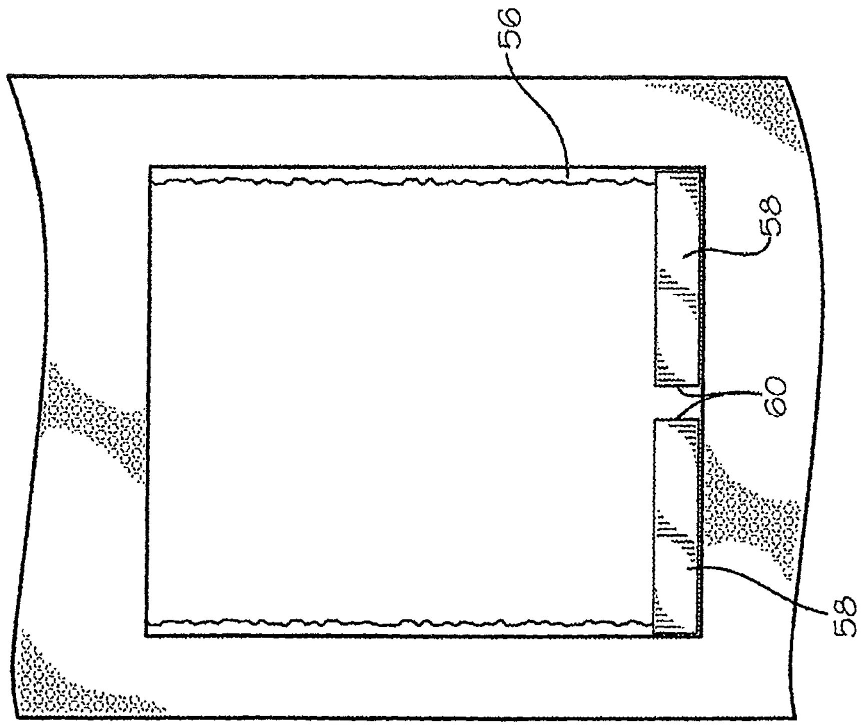

With reference next to FIG. 8, lower conductive strips 58 are then attached by electrically conductive adhesive, bonding through conductive ink, or other bonding method, onto a bottom edge of the carbon veil material 52. Each lower conductive strip 58 is electrically coupled to a side rail 56. The lower conductive strips 58 may be made of an aluminum foil or other electrically conductive material. The lower conductive strips 58 are electrically insulated from the carbon veil material 52. The lower conductive strips 58 have connecting ends 60 which are spaced from each other so as to accept a connection circuit board described in more detail hereinafter.

Figure 9:
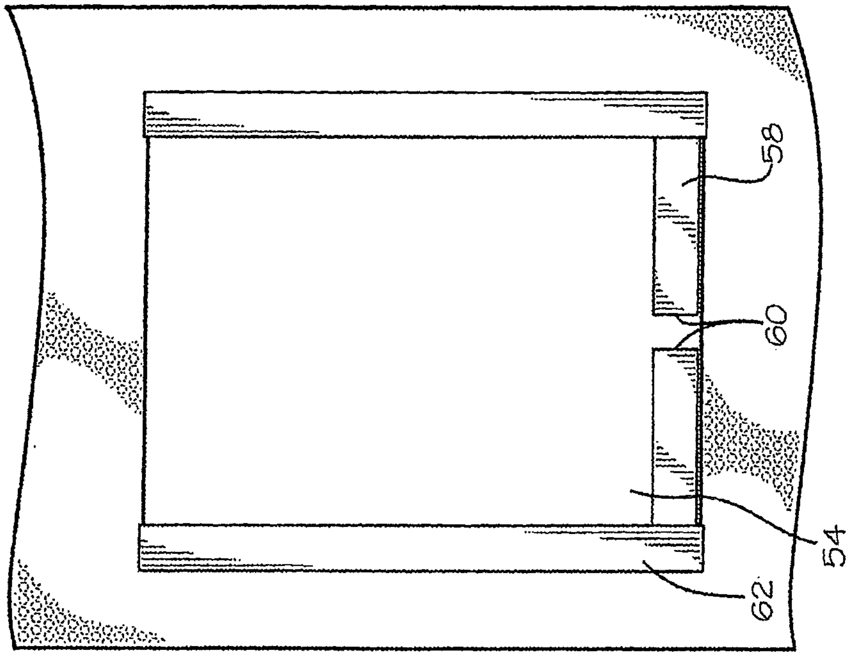

With reference next to FIG. 9, side conductive strips 62 are then sewed onto the conductive ink side rails 56 in electrical contact with the conductive ink side rails 56. The nickel boundary of the conductive ink side rails 56 prevent resistance drift from occurring. The side conductive strips 62 are also sewn so as to be in electrical contact with the lower conductive strips 58.

The second layer of spunbond material 63 is then laminated or otherwise bonded (adhesive, sonic welding, or the like) about the periphery of the fourth layer (spunbond material) 18 and/or carbon veil material 52, thereby sandwiching the carbon veil material 52 between two layers of spunbond material. The second layer of spunbond material 63 protects the carbon veil material 52 while providing a soft exterior layer for patient comfort and safety. The combination of the second layer of spunbond material 63 with the first layer of spunbond material (metalized fabric) essentially creates an envelope surrounding or encasing the carbon veil.

Figure 10:
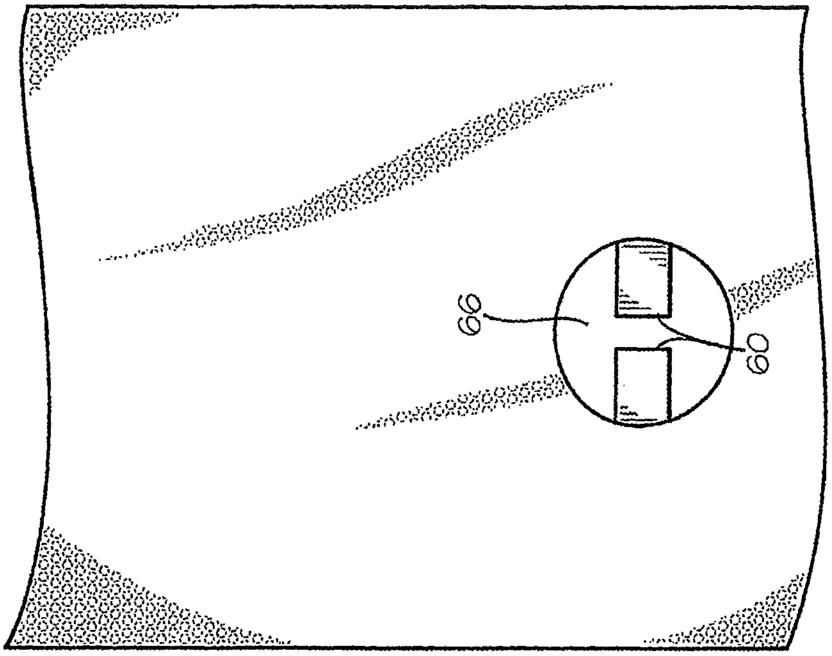
Figure 12:
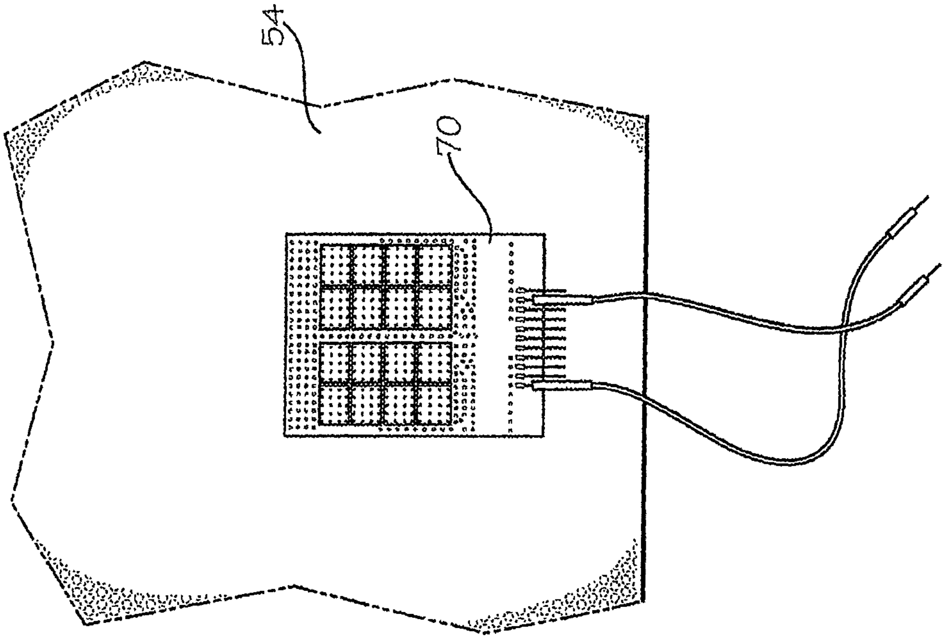
Figure 11:
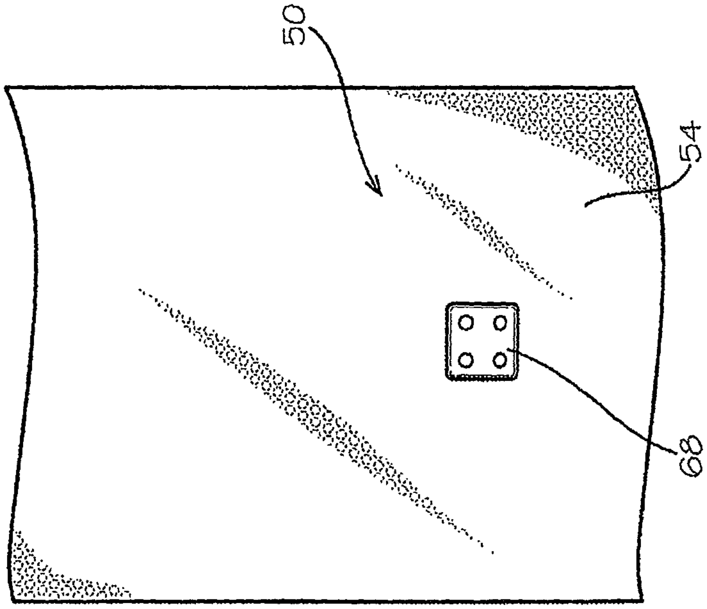
Figure 13:
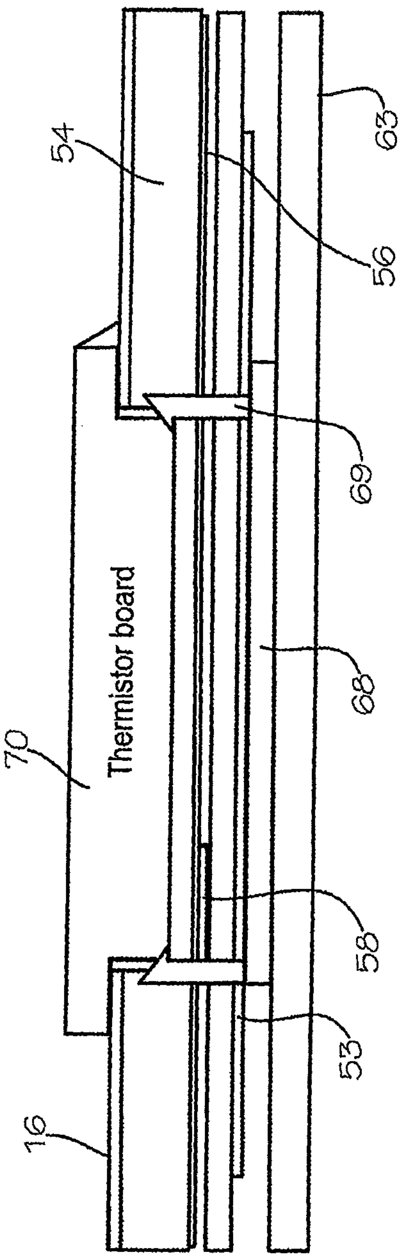
FIG. 13 is a cross-sectional view of a portion of the warming blanket shown in FIGS. 7-12.

With reference next to FIG. 10, a hole or opening 66 is cut into the metalized fabric 54 so as to expose the connecting ends 60 of the lower conductive strips 58. A backing plate 68 is then attached to the backside of the second layer of spunbond material 63 at the position of the opening 66, as shown in FIG. 11, or to a patch of spunbond material which is then adhered to the patient side of the blanket. The backing plate 68 may be passed through a slot or cut 67 in the second layer of spunbond material 63 so as to be placed flush against the patch 53, as shown in FIG. 13. The use of the backing plate 68 provides local support of the connection points of the warming blanket as well as providing pressure between the contact surfaces of the thermistor board and the lower conductive strips 58 (cross rails). The backing plate 68 includes a set of mounting prongs 69 which extend through or are punched through the patent 53 and carbon veil material 52 so that they may engage, fit upon a snap-on circuit board 70 containing thermistors 71, or thermocouples. The circuit board 70 is then mounted to the exterior surface of the metalized fabric 54 and connected to the connecting ends 60 of the lower conductive strips 58, as shown in FIGS. 12 and 13. The circuit board 70 includes a large array of vias to assist heat transfer to where the thermistors are located. The use of a large circuit board for connection purposes provides a more accurate average temperature of the heating fabric (carbon veil material), i.e., the temperature is sensed over a larger area for averaging purposes to minimize the possibility of errors. The vias transfer heat to the top side of the circuit board so that the thermistors can be captured within the connector housing. This arrangement also shields the thermistors for the safety of the operator.

In use, electric current is controlled through the circuit board 70 and passed to the connecting ends 60 of the lower conductive strips 58. The current then travels to the side conductive strips 62 and conductive ink side rails 56 where it is then passed to the carbon veil material 52 wherein resistive heat is created. The metalized fabric reflects the heat to produce an even distribution and more efficient use of the heat. The lofted material layers diffuse the heat to avoid a concentration of heat or hot spot.

The circuit board 70 uses multiple thermistors to minimize variance. The placement of the thermistors on the circuit board 70 enables them to be on a re-useable portion of the warming blanket 50 rather than the disposable "blanket" or material covering portion. This placement reduces the replacement costs of the warming blanket.

It is believed that the sewing of the conductive foil of the lower conductive strips 58 and side conductive strips 62 to the second layer of spunbond material 63 and carbon veil material 52 provides a better electrical connection. It is also believed that the sewing maintains a better drapeability of the warming blanket. The improved drapeability is important for patient comfort, effective warming, and reduced cost of manufacture.

Figure 14:
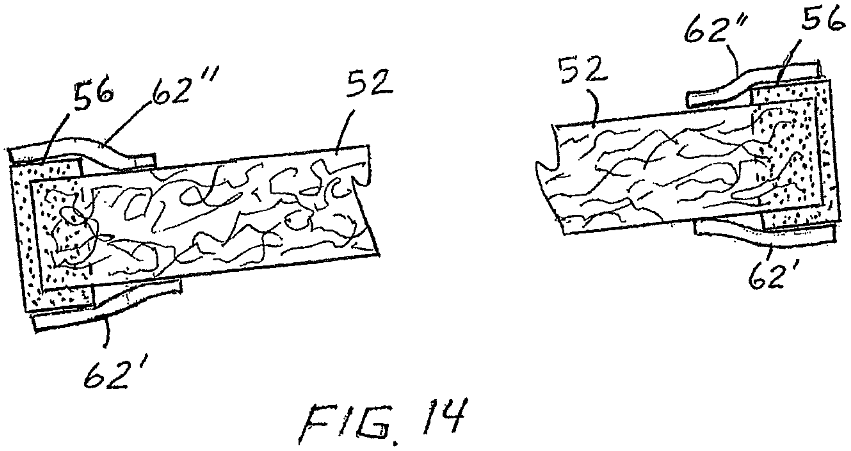
FIG. 14 is a cross-sectional view of a portion of the carbon veil and conductive ink side rail of the warming blanket in another preferred embodiment.
Figure 15:
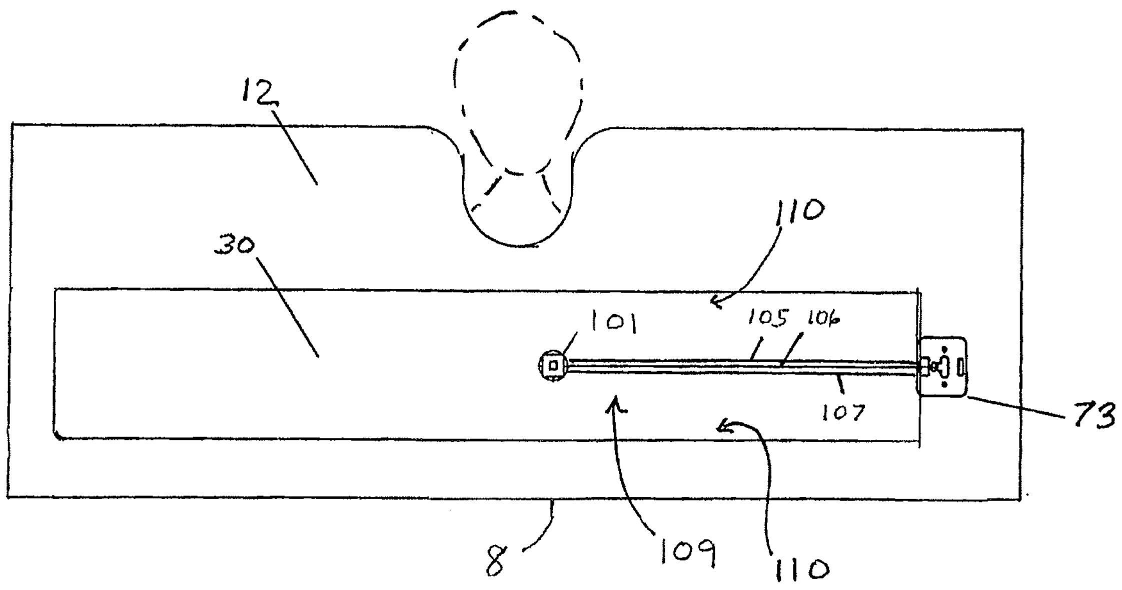
FIG. 15 is a plan view of a warming blanket embodying principles of the invention in another preferred form, with a layer removed to view the internal components.
Figure 18:
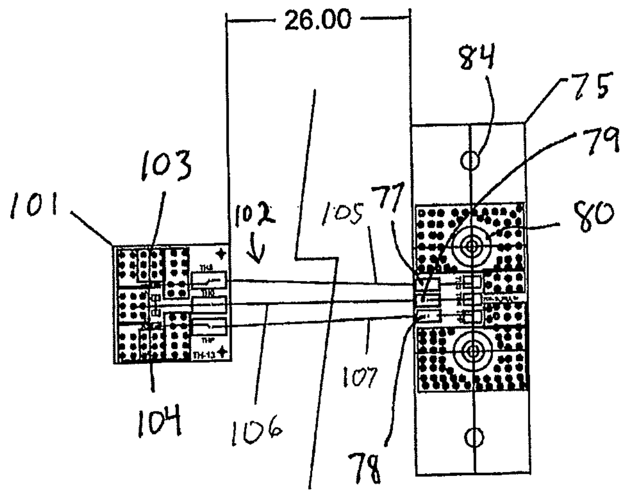
FIG. 18 is a plan view of a thermistor board assembly of the warming blanket of FIG. 15.
Figure 16:
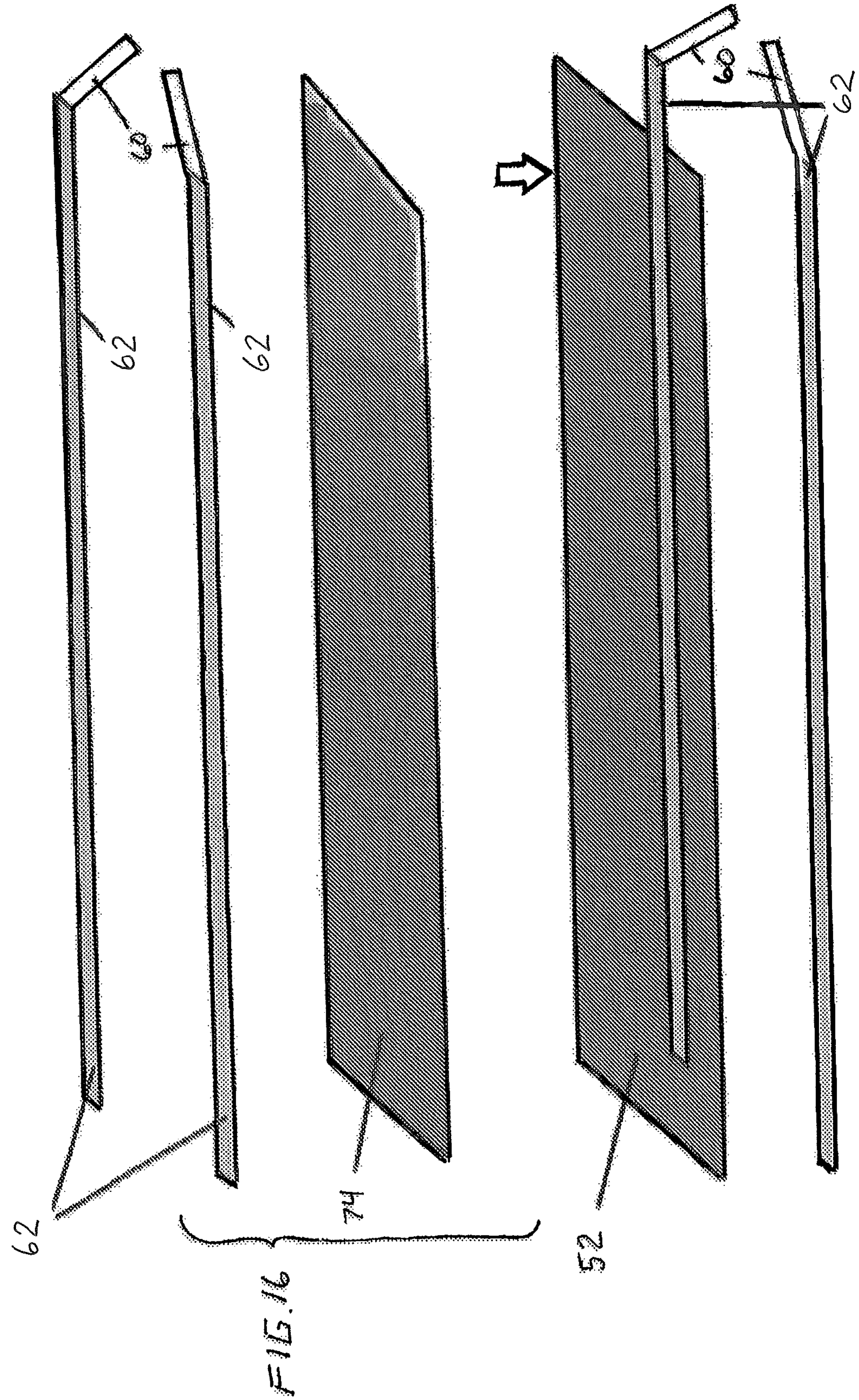
FIG. 16 is a perspective, exploded view of a heating sub assembly portion of the "3" warming blanket of FIG. 15.
Figure 17:
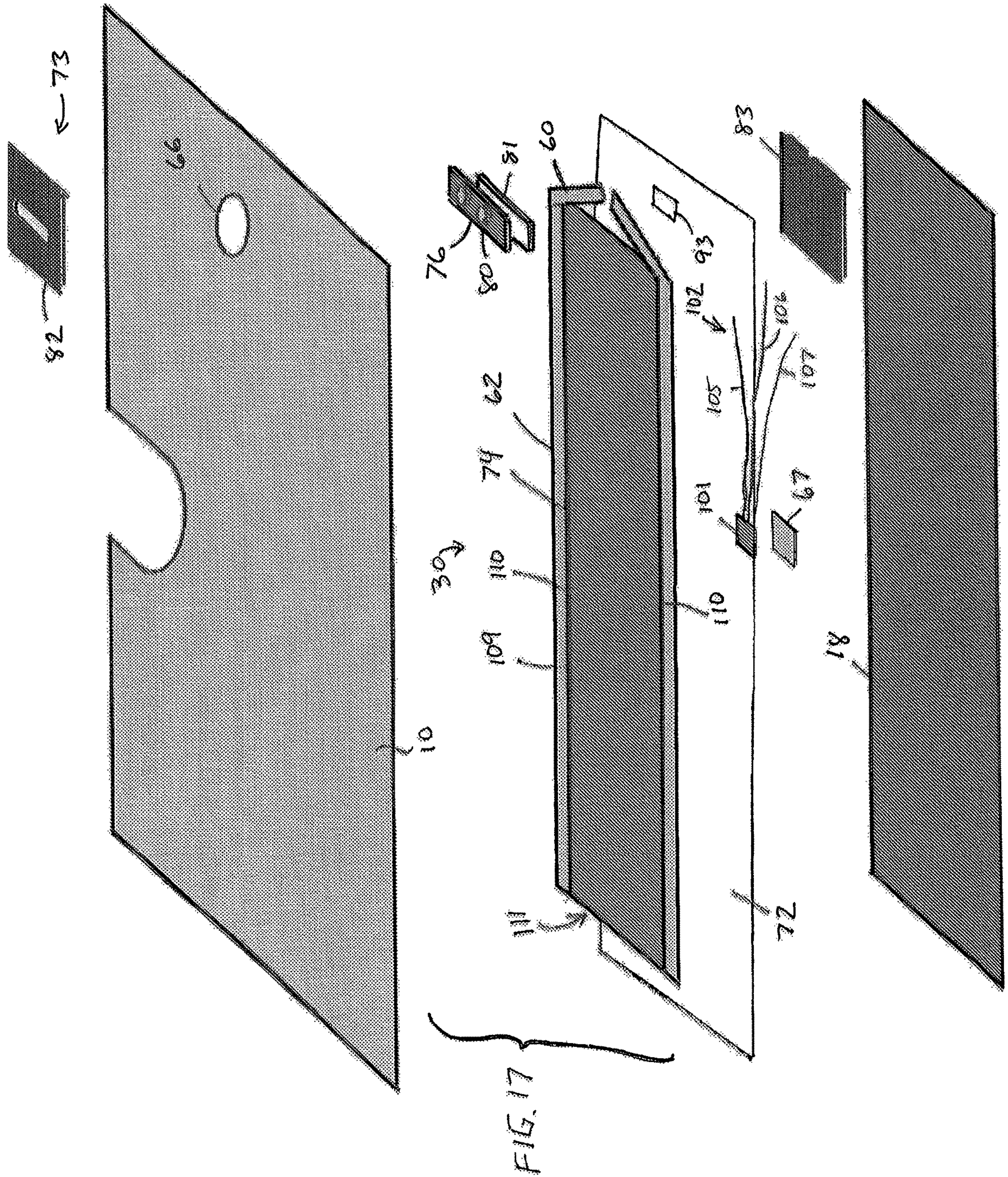
FIG. 17 is a perspective, exploded view of the warming blanket of FIG. 15.

The coupling process of the lower conductive strips 58 and the side conductive strips 62 preferably is accomplished with the use of non-conductive cotton-poly blend threads. With reference next to FIG. 14, there is a shown a portion of the carbon veil material 52.

Here, the conductive ink side rails 56 are deposited upon the carbon veil material 52 so that the conductive ink penetrates into the interior or is embedded within the interior portion of the carbon veil material. Preferably, the conductive ink penetrates completely from one surface to the opposite surface, i.e., the conductive ink penetrates the entire thickness of the carbon veil, the "thickness" being the material size along the direction extending between the top surface and the bottom surface. The conductive ink may be as previously described, or may be a metal coated particle or flake such as copper ink, a silver coated carbon particle, a silver coated copper particle, or other similar material bound with a polymer. The polymer may be a latex or other suitable material.

In use, the conductive ink is applied or deposited upon the carbon veil in the following manner. The top surface of the carbon veil is masked to define a border or margin. A bottom foil side conductive strip 62' is then sewn to the side border of the carbon veil 52. A viscous electrically conductive ink to then deposited upon the margin or border area. Pressure is applied to the viscous conductive ink to force the conductive ink into carbon veil, specifically into the interstices between the fibers of the carbon veil. Thus, the conductive ink is saturated into the carbon veil so as to saturate or extend throughout the entire thickness, height or depth of the carbon veil, the depth being the thickness or depth in the vertical direction shown in FIG. 13 and often referred to as the Z-axis. A top foil side conductive strip 62" is then applied to the viscous conductive ink, which acts as an adhesive to bond the top foil side conductive strip 62" in place. A heat is then provided to cure the conductive ink.

It is believed that by having the conductive ink throughout the entire thickness of the carbon veil a better conductive connection is made by the conductive ink. As the carbon fibers of the carbon veil as short and separate from each other, there is a better disbursement of the electric current across the carbon veil as the interior carbon fibers now come into direct contact with the conductive ink and therefore better carry the electric current. This better disbursement of the electric current provides for an even heat and the avoidance of hot spots.

With reference next to FIGS. 15-19, there is shown a warming blanket 8 embodying principles of the invention in another preferred form. The heating portion 30 is positioned between the metalized fabric 10 and the spunbond material fourth layer 18. The warming blanket 8 also has an additional electrically insulating layer 72 of spunbond material positioned between the heating portion 30 and the fourth layer 18. The insulating layer 72 is larger in both length and width than the heating portion 30 and is positioned oppositely from a heating portion mask 74, described hereinafter. The heating portion 30, best shown in FIG. 16, includes a carbon veil material 52 having upper and lower conductive strips 62, and the mask 74 overlaying the carbon veil material 52 between the laterally opposed conductive strips 62. The mask 74 is made of the previously described spunbond material and is positioned between the carbon veil material 52 and the metalized fabric 10. The elongated connecting ends 60 of the side conductive strips 62 extend past the edge of the carbon veil material 52 and mask 74. The connecting ends 60 form clongated connectors which are bent or folded inwardly so that they extend inwardly at an angle from the generally horizontal conductive strips 62, which eliminates the need of physically joining connecting ends 60 to the conductive strips 62, as previously described. The connecting ends 60 should not be positioned within the heating zone of the warming blanket, as this could change the local heat transfer profile that could introduce a larger variance in the heated zone temperature.

The warming blanket 8 also includes a hub connector or hub connecting portion 73 that includes a blanket connection board 75 mounted to the heating portion 30. The blanket connection board 75 has three electrical contact plates comprised of a first thermistor contact plate 77, a second thermistor contact plate 78, and a ground contact plate 79 positioned between the first thermistor contact plate 77 and the second thermistor contact plate 78. The blanket connection board 75 also includes two electrically conductive female snap portions or snap receivers 80. The three electrical contact plates 77, 78 and 79 are positioned between and electrically coupled to the two female snap portions 80.

The blanket connection board 75 also includes a lower mounting plate 82 positioned against the exterior lower surface 11, and a base mounting plate 83 positioned against the exterior of the insulating layer 72 and covered by the fourth layer 18. A foam spacer 81 may be positioned between a portion of the base mounting plate 83 and the side conductive strips 62 to maintain a more consistent pressure or electrical connection between the side conductive strips 62 and the snap receivers 80 of the connection board 75.

The blanket connection board 75 includes two mounting holes 84 which are aligned with two mounting holes 85 in the lower mounting plate 82 and two mounting holes 86 in the base mounting plate 83. Mounting screws 87 pass through mounting holes 85 and mounting holes 84, and are threaded into mounting holes 86 so that the blanket connection board 75 is sandwiched between and secured to lower mounting plate 82 and base mounting plate 83.

Figure 22:
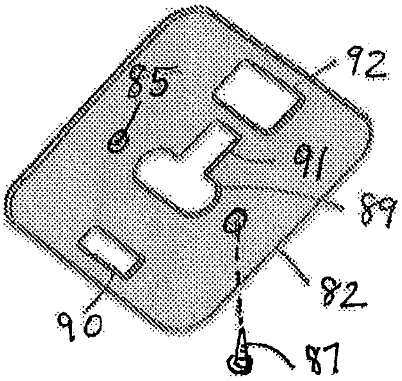
FIG. 22 is a perspective view of the lower mounting plate of the warming blanket of FIG. 1

As best shown in FIG. 22, the lower mounting plate 82 has an elongated opening 89 therethrough through which female snap receivers 80 extend so that the female snap receivers 80 and the three electrical contacts 77, 78 and 79 are exposed. The lower mounting plate 82 also has a generally rectangular first tang or prong opening 90, a second tang or prong opening 91, and a third tang or prong opening 92. The third prong opening 92 is aligned with a hole 93 extending through the insulating layer 72.

Figure 20:
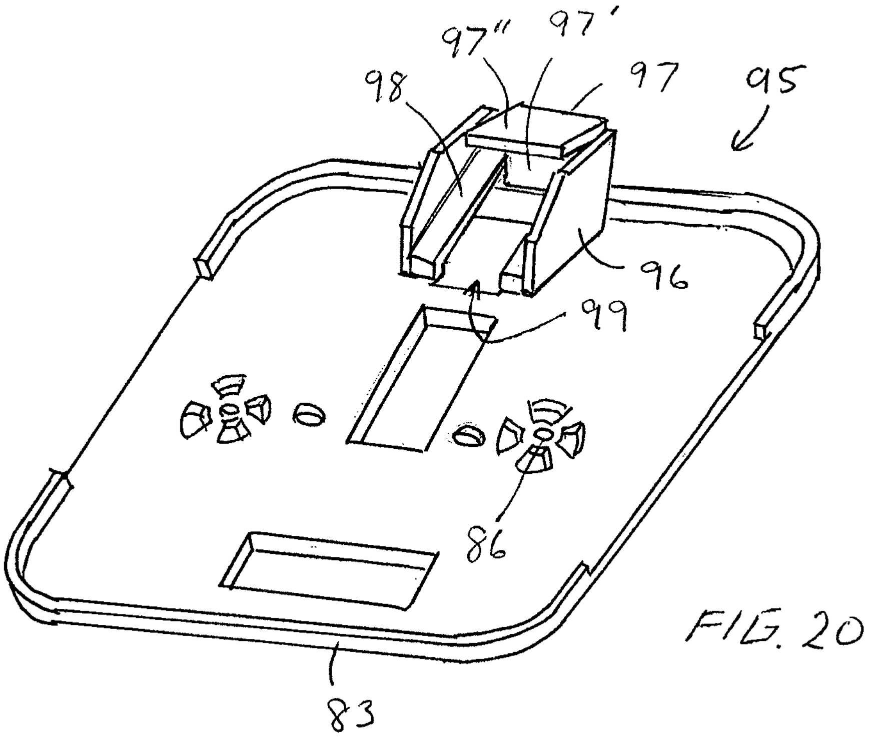
FIG. 20 is a perspective view of the base mounting plate of the warming blanket of FIG. 15.
Figure 21:
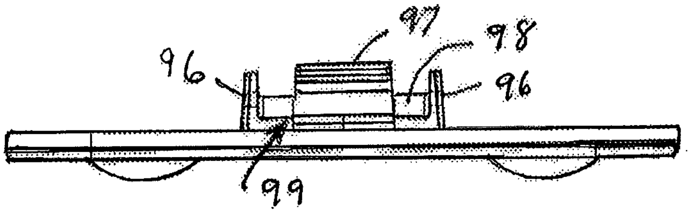
FIG. 21 is a front view of the base mounting plate of the warming blanket of FIG. 15.

As best shown in FIG. 20, the base mounting plate 83 includes a guide assembly 95 that has two outwardly projecting side guide rails 96 and a generally L-shaped guide flange or tongue 97 positioned between the two side guide rails 96. The L-shaped guide flange 97 has a first portion or abutment wall 97' and a second portion or overhanging top ledge 97". The two side guide rails 96 include an inwardly extending floor 98 which is also sloped upwardly as the floor extends from a low position distal the guide flange 97 to a high position adjacent or proximal the guide flange 97. The combination of the two side guide rails 96 and guide flange 97 forms a tongue receiving channel 99. The guide assembly 95 extends through metal fabric opening 66, through insulating layer hole 93, and through the third prong opening 92 in the lower mounting plate 82.

A remote temperature sensor assembly 101 is electronically coupled to the connection board 75 through three elongated electrical conduits, wires or connectors 102. The remote temperature sensor assembly 101 includes a first temperature sensor in the form of a first thermistor 103 and a second temperature sensor in the form of a second thermistor 104. The first thermistor 103 is coupled to the connection board 75 through a first positive connector 105 and a common ground connector 106. The second thermistor 104 is coupled to the connection board 75 through a second positive connector 107 and the common ground connector 106. The first and second thermistors having a resistance rating of 110K ohms to prevent self-heating. The remote temperature sensor assembly 101 is coupled to the exterior surface of the insulating layer 72 through an overlaying length of electrically insulative adhesive tape to measure the temperature of the heating portion 36 directly adjacent the remote temperature sensor assembly 101.

The remote temperature sensor assembly 101 is positioned approximately over the center or central region 109 of the heating portion 30 and carbon veil material 52. Preferably, the central region 109 commences approximately 1 inch from the interior edge of the side conductive strips 62, i.e., a one inch margin 110 extends between the central region 109 of the carb veil material 52 and the side conductive strips 62. The central region 109 and margin 110 combine to define an exposed surface or area 111 of the carbon veil material 52 as this region is not overlaid by the side conductive strips 62. As the material of the heating portion 36 preferably has a longitudinal length of 60 inches and a lateral width of 12 inches, and the lateral width of one inch for each side conductive strip 62, resulting in the exposed area 111 of the carbon veil having a lateral width of 10 inches. With at least a one inch margin on the exposed area 111 adjacent to each side conductive strip 62, the central region 109 occupies at most approximately 80% of the area of the exposed area 111. While the central region 109 may occupy at most 80% of the exposed area 111, the central region 109 may be considered to occupy at most 50% of the exposed area 111 for a more consistent temperature sensing. It is believed that occupying at most 30% of the exposed area would provide an even better sensing of the temperature, while occupying at most 10% of the exposed area 111 would provide an optimal sensing of the temperature, as the more centrally located the temperature sensor assembly 101 the more consistent a temperature reading is produced.

Figure 19:
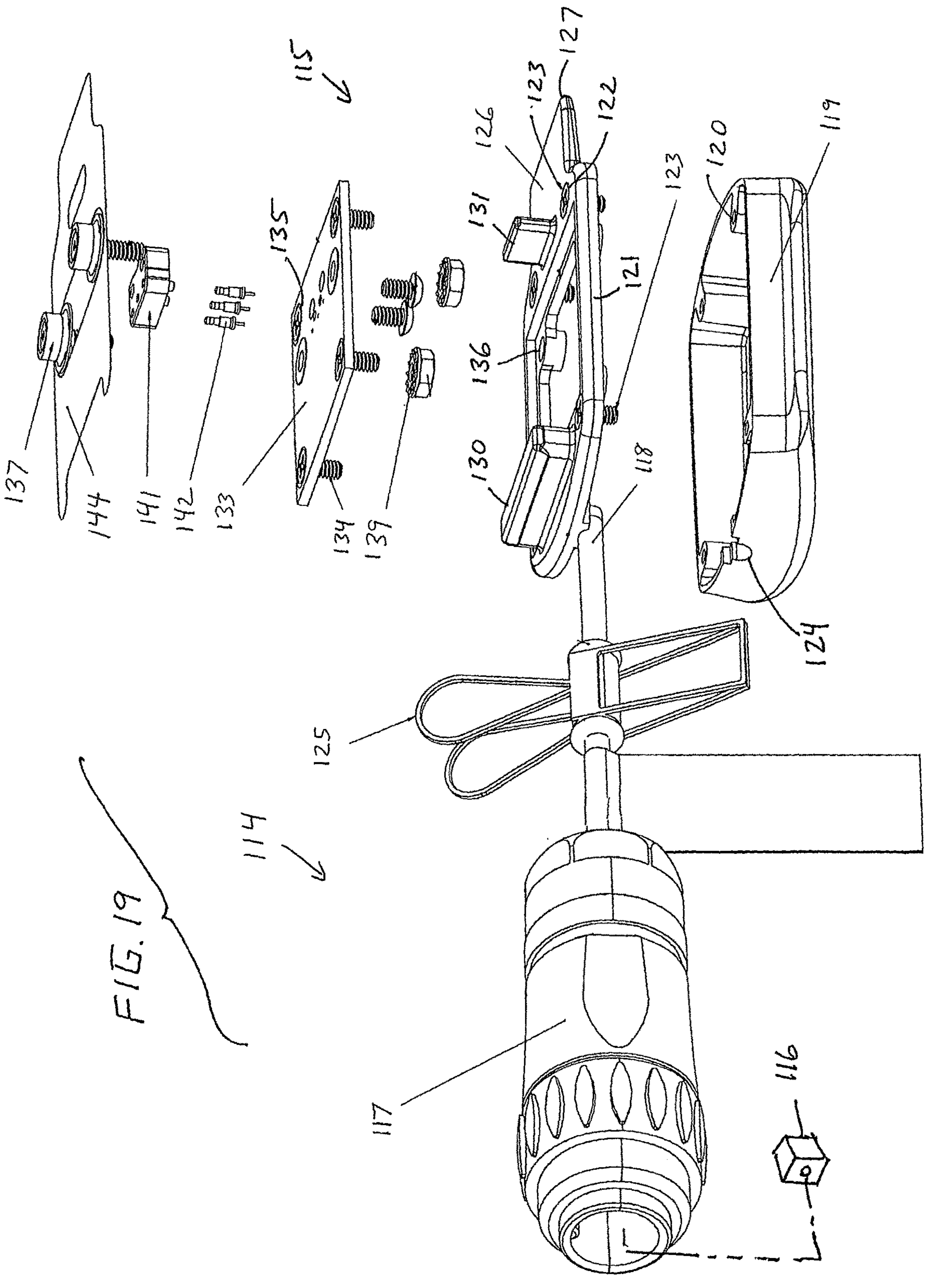
FIG. 19 is a perspective, exploded view of the hub assembly of the warming blanket of FIG. 15.

The warming blanket 8 also includes a removably mounted connector assembly 114 which is removably coupled to the hub connector or connecting portion 73, as best shown in FIG. 19. The connector assembly 114 has a hub assembly 115, a connection plug 117, and a multi-conductor cable 118 extending between and electrically coupled to the hub assembly 115 and connection plug 117. The connection plug 117 is configured to be received or mated within the socket of an electric controller box 116 which includes the circuitry and software to operate the warming blanket 8. The connection plug 117 may have a multi-pin construction, such as a 7 pin configuration for easy of coupling to a matching configuration socket or receiver in the electric control box 116. The conductor cable 118 may include a linen clip 125 which releasably holds the conductor cable 118 in place upon bed linen or the like.

The hub assembly 115 has a main hub housing 119 having four mounting screw holes 120, and a hub housing cover 121 with four screw holes 122 aligned with mounting screw holes 120. Four mounting screws 123 extend through screw holes 122 and are threaded into mounting screw holes 120. The main hub housing 119 has a cable opening 124 to allow the passage of the cable 118 into the housing 119.

The hub housing cover 121 has an elongated mounting tongue 126 extending outwardly and oppositely from the cable 118 to a tongue leading edge 127. The mounting tongue 126 has a configuration so that the mounting tongue 126 is received within the tongue receiving channel 99 of the guide assembly 95, i.e., the mounting tongue 126 has a width that closely fits between the side guide rails 96 and below the L-shaped guide flange 97. The mounting tongue leading edge 127 abuts the abutment wall 97' and the underside of the overhanging top ledge 97" when the hub assembly is coupled to the hub connector. The hub housing cover 121 also has an outwardly extending first tongue, prong or flange 130 configured to be received within first prong opening 90 in the lower mounting plate 82, and an outwardly extending second tongue, prong or flange 131 configured to be received within the second prong opening 91.

A PC board 133 is mounted withing the main hub housing 119 and secured thereto through four mounting screws 134 extending through screw mounting holes 135 in the PC board 133 and threaded into screw mounting holes 136 in the hub housing cover 121. Two electrically conductive male snap connectors 137 are electrically coupled to conductors within the multi-conductor cable 118. The two male snap connectors 137 are configured to releasably mate or be coupled with the two female snap portions 80 in order to make a releasable electrical connection between the connector assembly 114 and hub connecting portion 73. Each male snap connector 137 is threadedly coupled to an internally threaded nut 139 to fix the male snap connector 137 to the circuit board 133. A contact block or guide 141 extends outwardly from the PC board 133. The contact guide 141 includes three contact pins 142 which are in electrical contact with the wiring or conductors associated with the multi-conductor cable 118. The three contact pins 142 includes a first contact pin 143 configured to make contact with or engage the first thermistor contact 77, a second contact pin 144 configured to make contact with or engage the second thermistor contact 78, and a third contact pin 145 configured to make contact with or engage the ground contact 79, each of the hub connection board 75. An identification label 144 is adhered to the external surface of the PC board 133.

In use, the connector assembly 114 is coupled to the hub connecting portion 73 by tilting the hub connection portion 73 at an inclined angle with respect to the connector assembly 114 and moving the hub connecting portion 73 into engagement with the guide assembly 95. This is done by moving the mounting tongue 126 forwardly into the tongue receiving channel 99 between the two side guide rails 96 and beneath the guide flange 97. Once the mounting tongue 126, and specifically the leading edge 127, contacts the upright portion of the guide flange 97 the connector assembly 114 is pivoted downwardly into flush abutment or contact with the hub connecting portion 73. This alignment and pivotal movement results in the correct alignment and releasable connection being made between the two male snap connectors 137 and the two female snap portions 80. Once the male snap connectors 137 are coupled to the female snap portions 80, the first contact pin 143 contacts the first thermistor contact 77, the second contact pin 144 contacts the second thermistor contact 78, and the third contact pin 145 contacts the ground contact 79, thereby completing an electrical connection between the hub connection portion 73 and the connector assembly 114. The first prong 130 is received within the first prong opening 90 and the second prong 131 is received within the second prong opening 91 to prevent the unwanted separation of the hub connection portion 73 from the connector assembly 114 through horizonal movement, such as the accidental pulling of the multi-conductor cable 118.

With the two thermistors 71 positioned with a central region 109, as opposed to the prior art configuration wherein the sensors are positioned within or near a side margin, the temperature of the heating portion 30 can be very closely monitored for variances in the sensed temperature.

With this configuration, the heating of the heating portion 30 can be maintained within one tenth of one degree Celsius of the set point temperature of the heating blanket 8, as the central region 109 provides a more consistent heat than the margin 110 because of the electrical pathways and current variations associated with the margin and the connection therewith to the side conductive strips 62.

A perceived problem may be that the thermistors are not perfect, and the actual value determined by the thermistor is always a little different than the specified value. This variance is specific to a particular thermistor. Therefore, it would be useful to be able to calibrate the thermistors by measuring performance and then storing that performance on the electronics of the blanket system. To do this, it would be possible to include a single line memory chip on the thermistor board, then at manufacture the thermistor could be calibrated against a standard temperature, and the offset recorded in the chip of the electronics. The control system would read this for each thermistor and adjust the read temperature accordingly.

With the use of two independent thermistor circuits, one is used for controlling temperature while the other one is used as an over-temperature monitor. If the two thermistor circuits do not match in temperature within a few tenths of a degree, the heating cuts off and the system goes into an error mode. This error is detected if the monitor is hotter than the control thermistor. It is also detected if the controller is hotter than the monitor. Additionally, if the system detects the temperature is not increasing at a fast enough rate, the system faults our and shuts down.

As an alternative to the sewing of the bottom foil side conductive strip, the conductive strip may be coupled to the carbon veil through sonic welding.

It should be understood that the description is for one method of constructing the warming blanket. The exact sequence of the steps involved in the construction may differ while still embodying the invention.

It should be understood that as used herein the term electrically conductive mat, veil or web does not require the entire veil or web to be composed of electrically conductive fibers. For example, the electrically conductive veil or web may be made of 30% electrically conductive fibers and 70% of cellulose material. The composition will determine the resistance of the electrically conductive veil, and therefore the heat produced by such.

It should be understood that sewing, adhesive bonding, sonic welding, heat welding, or any other conventional method of bonding or coupling, as used herein, are equivalent.

It thus is seen that a heating blanket using a metalized fabric and a method of manufacturing such is now provided which overcomes problems associated with heating blankets of the prior art. It should of course be understood that many modifications may be made to the specific preferred embodiment described herein, in addition to those specifically recited herein, without departure from the spirit and scope of the invention as set forth in the following claims.

The invention claimed is:

1. An electrical connector comprising:

a hub connector having a mounting plate, a pair of spaced apart side guide rails extending from said mounting plate, a guide flange with a first portion extending from said mounting plate and a second portion extending laterally from said first portion, said guide flange being positioned between said side guide rails, and a pair of electrically conductive first snap portions coupled to said mounting plate;

a hub assembly removably coupled to said hub connector, said hub assembly having a hub housing, a mounting tongue extending from said hub housing and being sized and shaped to fit between said spaced part side guide rails and between said second portion of said guide flange and said mounting plate, and a pair of electrically conductive second snap portions configured to mate with said pair of electrically conductive first snap portions, and said pair of electrically conductive second snap portion being coupled to said hub housing to be in alignment with said pair of electrically conductive first snap portions when said mounting tongue abuts said first portion of said guide flange;

wherein said mounting plate of said but tor ng opening and wherein said hub housing includes a first prong configured to be received within said first prong opening;

wherein said mounting plate of said hub connector includes a second prong opening, and wherein said bub housing includes a second prong configured to be receive within said second prong opening, and wherein said first prone opening is distal said guide flan e and id second prong opening is proximal said guide flange, and wherein said first is distal said mounting tongue and said second prone is proximal said mounting tongue.

2. The electrical connector of claim 1 further comprising at least one first electrical contact coupled to said mounting plate of said hub connector, at least one second electrical contact configured to electrically contact said at least one first electrical contact, said at least one second electrical contact being coupled to said hub housing to be in alignment with said at least one first electrical contact when said mounting tongue abuts said first portion of said guide flange.

3. The electrical connector of claim 2 further comprising a heating blanket coupled to said hub connector, said heating blanket having a pair of metal rails in electrical contact with said pair of electrically conductive first snap portions and in electrical contact with an electrical heating element.

4. The electrical connector of claim 3 wherein said heating blanket includes at least one temperature sensor coupled to said at least one first electrical contact.

5. The electrical connector of claim 1 wherein each said side guide rail has a floor sloping towards said second portion from a position distal said first portion to a position proximal said first portion.

6. An electrical connector comprising:

a hub connector having a mounting plate, side guide rails and a guide flange extending from said mounting plate to form a guide channel, said guide flange having an abutment wall and overhanging top ledge extending from said abutment wall, and a pair of electrically conductive first snap portions coupled to said mounting plate;

a hub assembly removably coupled to said hub connector, said hub assembly having a hub housing, a mounting tongue extending from said hub housing, said mounting tongue having a leading edge distal said hub housing, said mounting tongue being sized and shaped to be received within said guide channel with said leading edge of said mounting tongue being positioned against said abutment wall and against and below said overhanging top ledge, and a pair of electrically conductive second snap portions configured to mate with said pair of electrically conductive first snap portions, and said pair of electrically conductive second snap portion being coupled to said hub housing to be in alignment with said pair of electrically conductive first snap portions when said leading edge of said mounting tongue abuts said abutment wall and said tongue abuts said overhanging top ledge;

wherein said mounting plate of said hub connector includes a first prong opening, and wherein said hub housing includes a first prone configured to be received within said first prone opening:

wherein said mounting plate of said hub connector includes a second prong opening, and wherein said hub housing includes second prong configured to be received within said second prong opening, and wherein said first prong opening is distal said guide flange and said second prong opening is proximal said guide flange, and where said first prong is distal said mounting tongue and said second prong is proximal said counting tongue.

7. The electrical connector of claim 6 further comprising at least one first electrical contact coupled to said mounting plate of said hub connector, at least one second electrical contact configured to electrically contact said at least one first electrical contact, said at least one second electrical contact being coupled to said hub housing to be in alignment with said at least one first electrical contact when said leading edge of sad mounting tongue abuts said abutment wall of said guide flange.

8. The electrical connector of claim 7 further comprising a heating blanket coupled to said hub connector, said heating blanket having a pair of metal rails in electrical contact with said pair of electrically conductive first snap portions and in electrical contact with an electrical heating element.

9. The electrical connector of claim 8 wherein said heating blanket includes at least one temperature sensor coupled to said at least one first electrical contact.

10. The electrical connector of claim 9 wherein each said side guide rail has a floor sloping towards said abutment wall from a low position distal said abutment wall to a high position proximal said abutment wall.

11. A heating blanket electrical connector comprising:

a blanket portion having an electrical heating element, a cover overlaying said heating elements, pair of electrical heating element contacts electrically coupled to said electrical heating element, and a temperature sensor;

a hub connector coupled to said blanket portion, said hub connector having a mounting plate, a plurality of guides extending from said mounting plate to form a guide channel, said plurality of guides includes an abutment wall and overhanging top ledge extending from said abutment wall and directly over a portion of said guide channel, a pair of electrically conductive first snap portions coupled to said mounting plate and electrically coupled to said pair of electrical heating element contacts, and first connector electrically coupled to said temperature sensor;

a hub assembly removably coupled to said hub connector, said hub assembly having a hub housing, a mounting tongue extending from said hub housing and having a leading edge distal said bub housing, said mounting tongue being sized and shaped to be received within said guide channel with said leading edge positioned below said overhanging top ledge, a pair of electrically conductive second snap portions configured to mate with said pair of electrically conductive first snap portions, and second connector electrically couplable to said first connector when said hub assembly is coupled to said hub connector;

wherein said mounting plate of said hub connector includes a first prong opening. and wherein said hub housing includes a first prong configured to be received within said first prong opening;

wherein said mounting plate of said hub connector includes a second prong opening, and wherein said hub housing includes a second prong configured to be received within said second prong opening, and wherein said first opening is distal said overhanging top ledge and said second prong opening is proximal said overhanging top ledge, and wherein said first prong is distal said mounting tongue and said second prong is proximal said mounting tongue.

12. The heating blanket electrical connector of claim 11 wherein each said side guide rail has a floor sloping towards said abutment wall from a low position distal said abutment wall to a high position proximal said abutment wall.

* * * * *